United States Patent [19]

Gupta et al.

[11] 3,953,615
[45] Apr. 27, 1976

[54] HYDRATION DRYING OF COFFEE, TEA, OR JUICE CONCENTRATE BY MEANS OF ANHYDROUS DEXTROSE

[75] Inventors: Ashis S. Gupta, Marietta; Clifford A. Shillinglaw, Dunwoody, both of Ga.

[73] Assignee: The Coca-Cola Co., Atlanta, Ga.

[22] Filed: Dec. 17, 1973

[21] Appl. No.: 425,468

Related U.S. Application Data

[63] Continuation of Ser. No. 168,727, Aug. 3, 1971, abandoned.

[52] U.S. Cl. .............................. 426/594; 426/443; 426/465; 426/597; 426/599; 426/658
[51] Int. Cl.² ...................... A23F 1/12; A23F 3/00; A23L 2/08
[58] Field of Search ........... 426/365, 366, 369, 443, 426/465, 380, 213, 594, 597, 599, 658

[56] References Cited
UNITED STATES PATENTS

| | | | |
|---|---|---|---|
| 1,481,893 | 1/1924 | Fleming | 99/206 |
| 2,147,238 | 2/1939 | Bruce | 99/155 |
| 2,471,678 | 5/1949 | Flosdorf | 99/206 |
| 2,513,813 | 7/1950 | Milleville | 99/205 |
| 2,567,038 | 9/1951 | Stevens et al. | 426/366 |
| 2,826,504 | 3/1958 | Chase et al. | 426/366 |
| 2,906,630 | 9/1959 | Turkot et al. | 99/206 |
| 2,970,948 | 2/1961 | Stevens | 99/106 |

*Primary Examiner*—Curtis P. Ribando
*Attorney, Agent, or Firm*—W. Dexter Brooks

[57] ABSTRACT

A hydration drying process is described for producing an improved free-flowing, non-hygroscopic food and-/or beverage powder. The process involves the admixing of a juice concentrate with a predetermined amount of anhydrous dextrose in an agitating device until the desired degree of dryness is achieved. If desired, the rate of hydration of the dextrose molecules can be expedited by subjecting the mixture to a hydration enhancing step at a low temperature either during or after agitation of the mixture. When compared to conventional drying processes, the present invention is more economical, retains desirable volatiles, and develops negligible off-flavors during processing.

3 Claims, No Drawings

3,953,615

HYDRATION DRYING OF COFFEE, TEA, OR JUICE CONCENTRATE BY MEANS OF ANHYDROUS DEXTROSE

This is a continuation of application Ser. No. 168,727 filed Aug. 3, 1971, now abandoned.

BACKGROUND OF THE INVENTION

This invention relates to a process for drying juice products to provide improved non-hygroscopic, free-flowing food and/or beverage powders. More particularly, the invention relates to a hydration drying process for producing dried fruit, vegetable or botanical powders which are free-flowing, non-hygroscopic and upon reconstitution in a liquid such as water are characterized by their excellent quality, color, viscosity, fragrance, palatability and their freedom from "air sols" and surface foam.

This invention also has application to the production of non-food and/or non-beverage products of a composite character, wherein the components are water-soluble, water-absorptive or water dispersible.

When referring to a fruit, vegetable or botanical powder in the title and specification, it will be recognized that by "powder" is meant a subdivided solid material that has so little free moisture that it is free-flowing and can be readily spooned from a jar or other container. No specific particle size is to be implied other than that it be such that the material is free-flowing and will dissolve to a large extent in a liquid such as water within a reasonable period of time. The term "reconstitution" as used herein, relates to the mixing of a dried fruit, vegetable and/or botanical powder with a liquid such as hot or cold water, milk, or in some cases with semi-liquid or other food ingredients, to produce a reconstituted product. The reconstituted product may be a juice beverage, concentrate, sauce, pudding, soft drink or a puree, and may be derived from natural, commercially-available fruits and/or vegetables and/or botanical plants. The term "Brix" is a common unit of measurement to express the concentration of dissolved solids in an aqueous solution and has been specified as the unit to be used in all Food and Drug Administration, U.S. Department of Agriculture and the Florida Citrus Code for fruit products and particularly for concentrated fruit juices.

Fresh fruit juices typically contain about 84–92% of water. This high water content places a heavy burden on the packaging, handling, storing and shipping of such juices and has stimulated the development of many processes for the partial or complete dehydration of such juices. Conventional processes include spray drying, vacuum shelf or belt drying, drum drying, foam-mat drying and freeze drying. These processes generally involve the concentration of juice followed by the dehydration of the concentrate through the application of heat and/or vacuum under controlled conditions. Many difficulties have been encountered in such processes, especially those processes yielding dry, solid products, and heretofore there has been developed no practical and economical process for the production of free-flowing juice powders that can be readily reconstituted by the addition of a liquid to yield a product closely resembling a fresh juice beverage in quality, flavor and appearance.

Spray drying is not satisfactory in many cases because, as a result of the drastic heating conditions generally required, the dried product is usually found to be inferior to the original juice concentrate in flavor and stability. Also, such products are extremely hygroscopic, due partly to the natural hygroscopicity of juice solids and partly to the caramelization which takes place as a result of the heating. In many cases, it is difficult to spray dry the juices without the addition of large amounts of carriers. If used, these carriers can impart an undesirable taste to the product and are generally unacceptable at the concentration levels that are required for satisfactory spray drying.

Vacuum shelf or belt drying also imparts cooked flavor to the dried product and frequently causes caramelization of the product. This results in an undesirable taste and detracts from visual acceptance. Moreover, because of the high vacuum conditions of these drying processes, desirable volatiles are lost through vaporization.

In drum drying, the sugar present in the juice prevents the formation of a sheet which can be easily removed by the dryer's doctor blade or scraper. Instead of being able to remove a continuous dried sheet from the dryer, the dried juice yields a gummy mass after heating which collects at the doctor blade and disrupts the drying operation. This process also imparts an undesirable off-flavor to the product.

Foam-mat drying involves the use of a foaming agent in the juice during drying. This foaming agent causes formation of extremely small, microscopic bubbles and produces a larger surface for rapid and more complete drying of the juice powders. However, this process is unsatisfactory since the powders produced often contain incorporated microscopic air bubbles which can be detrimental to the flavor and stability of the powder. Upon reconstitution, "air sols" or colloidal dispersions of these air bubbles are formed throughout the solution. These bubbles impart to the reconstituted juice an unnatural, white, cloudy or milky appearance. After the reconstituted product stands a very short time, the "air sols" rise and collect on the surface as a dense layer of foam. The presence of this milky appearance and particularly the presence of the foam are detrimental to the physical appearance of the product and adversely affect their commercial acceptance.

Freeze drying in general produces the most acceptable product of conventional drying processes. However, the slow rate of sublimation from the frozen state and the high vacuum associated with the process result in loss of desirable volatiles through vaporization and make the process relatively expensive. Also, the dried product produced is hygroscopic and this adversely affects the storage stability and spoonability of the dried product.

In comparison to the present invention, major difficulties encountered in the foregoing conventional drying processes are (1) higher costs; (2) greater loss of volatile constituents during the drying process; and (3) development of undesirable off-flavors during the drying process, usually because of heat.

OBJECTS OF INVENTION

An object of the present invention is to provide an economical hydration drying process for fruit, vegetable and/or botanical juices. It is a further object of the present invention to provide a process for producing a non-hygroscopic, free-flowing fruit, vegetable, and/or botanical juice powder wherein the product suffers negligible heat damage and loss of desirable volatiles during processing. It is yet another object of the invention to provide a process for the production of a fruit, vegetable and/or botanical juice powder that may be quickly reconstituted by mixing the powder with a liquid such as water to yield a product closely resembling a fresh juice beverage in flavor and appearance. Another object of the present invention is to provide a process for drying fruit, vegetable and/or botanical juices with rapidity and economy and without a destruction of juice quality. Further objects of the invention will become apparent upon the understanding of the following description of selected embodiments of this invention and upon a study of the appended claims.

SUMMARY OF THE INVENTION

We have discovered a new drying process for producing an improved juice powder that can be readily reconstituted by the addition of a liquid such as water to yield a product closely resembling a fresh juice beverage in flavor, quality and appearance. This drying technique is referred to as hydration drying because substantially all of the moisture in the juice concentrate is converted into an internal or bound form of moisture in the dextrose molecules, thereby hydrating the anhydrous dextrose. Converting the moisture into a bound form leaves a negligble amount of moisture available for wetting or subsequent chemical reactions with other particles.

Stoichiometry teaches that every 100 grams of anhydrous dextrose requires about 9 grams of water to form the monohydrate. Thus, in order to establish the minimum amount of anhydrous dextrose required for the hydration drying of a juice concentrate according to the present invention and produce a free-flowing juice powder, it is necessary to determine (1) the amount of moisture that is present in the juice concentrate, and (2) the amount of free moisture that can be tolerated by the dried juice product while in a free flowing powdered state. This establishes the amount of moisture desired to be converted into a bound form in the dextrose molecules during the hydration drying process, from which the minimum amount of anhydrous dextrose required for drying can be determined. The amount of free moisture that can be tolerated by the dried juice product while in a free-flowing state will depend on the viscosity of the juice concentrate and the particle size of anhydrous dextrose used as the drying medium.

As an example, if anhydrous dextrose is used in the hydration drying of a substance such as 64° Brix orange juice concentrate, it will be necessary to convert most of the moisture in the juice concentrate into a bound form in the dextrose molecules since, due to the natural hygrogscopicity of juice solids, the dried orange juice product will not tolerate more than 2% free moisture while in a free-flowing powdered state. Thus, to produce a free-flowing orange juice powder according to the present invention, it is necessary to add at least eleven (11) grams of anhydrous dextrose for each gram of water present in the organe juice concentrate.

However, if anhydrous dextrose is used in the hydration drying of a substance such as 17.6 weight percent coffee extract, it is not necessary to use as much anhydrous dextrose as the drying medium since coffee is capable of tolerating some free moisture while in a free-flowing powdered state. We have determined that it is only necessary to add at least eight (8) grams of anhydrous dextrose for each gram of water present in the coffee extract to produce the desired free-flowing coffee powder according to the present invention.

We have discovered that granular, powdered, and/or pulverized anhydrous dextrose can be used in accordance with the present invention. When we refer to a granular state, it is meant that twenty percent anhydrous dextrose will pass through a 28 Tyler mesh screen. In a powdered state, 95 percent anhydrous dextrose will pass through a 28 Tyler mesh screen and thirty percent will pass through an 80 Tyler mesh screen. In a pulverized state, eighty-five percent anhydrous dextrose will pass through a 100 Tyler mesh screen and forty percent will pass through 200 Tyler mesh screen. Although the above particle sizes have been provided to show what is meant in the present invention by granular, powdered or pulverized anhydrous dextrose, it should be recognized that any particle size can be used in the hydration drying process. However, the finer the particle size, the greater the hydration drying rate will be. For example, if granular anhydrous dextrose is used as the drying medium, a longer hydration time will be required than if a powdered or pulverized anhydrous dextrose is used. This results since granular anhydrous dextrose does not have as much surface area as the latter two for hydration of the dextrose molecules with the moisture. For the same reason, powdered anhydrous dextrose requires a longer hydration time than pulverized anhydrous dextrose.

Moreover, we have discovered that the rate of hydration of the dextrose during the drying process can be expedited by incorporating a hydration enhancing step in the drying process. This entails subjecting the mixture of anhydrous dextrose and juice concentrate to low temperature heating either during or after agitation of the mixture where the mixture is exposed to low temperatures of about 35°C to 85° C. While this hydration enhancing step is not required, we have discovered that due to the low temperatures involved, the rate of hydration is increased without a great loss of volatile constituents and the development of undesirable off-flavors during the drying process.

In conventional drying processes, substantially all of the moisture in the juice concentrate is removed by vaporization techniques, which are generally recognized as adversely affecting the quality, flavor and appearance of resulting juice powders. The present invention is a departure from these conventional processes in that most of the moisture in the juice concentrate is not removed by vaporization, but instead is converted into bound form in the dextrose molecules. Only a negligible amount of the moisture is removed by vaporization during the hydration drying process. The free-flowing fruit juice powder of the present invention has a high moisture content of approximately 5–8% (virtually all of which is present as internal or bound moisture). In those juice powders capable of tolerating moisture in a free-flowing state, this high moisture content has been determined to be in excess of 8%. These improved powders of high moisture content have improved wettability and dispersibility in water during reconstitution. It should be recognized that there are no known free-flowing juice powders presently on the market having a moisture content of at least 5%. All known free-flowing juice powders have a moisture content of about 2%, most of which is in the form of free moisture.

The present invention has many advantages over conventional drying techniques. In addition to the primary advantage of being a practical and economical process, the process has an advantage of retaining flavors in the juice during the hydration drying process by avoiding conventional high temperature heating and/or high vacuum processes. Another advantage is the lack of flavor degradation of the juice concentrate during the hydration drying process. It is a further advantage of our novel process that the use of anhydrous dextrose acts not only as a drying medium and sweetening agent during processing, but also can act as a dessicant and prolong storage stability of the juice powder after processing if the dextrose molecules are not fully hydrated.

The present invention will be better understood by reference to the following examples of specific embodiments of juice powders according to the present invention. While the following examples illustrate the invention in relation to orange and grape juices, coffee and tea, it should be recognized that the present method is applicable to the drying of any fruit, vegetable or botanical juice, or to combinations thereof, as well as to a wide variety of food and/or beverage materials containing water in liquid or semi-liquid form, such as sauces, puddings, cocoa and soft drinks. Typical fruit juice concentrates are derived from oranges, lemons, grapefruits, pineapples, mangos, papayas, apples, tomatoes, prunes, and coffee berries, etc. Typical vegetable juice concentrates are carrots, beans, soya beans, potatoes, sweet potatoes, and the like. Typical botanical juice concentrates are tea, mate, cola extract, spices and commercial flavoring agents.

DETAILED DESCRIPTION OF INVENTION

EXAMPLE I

ORANGE JUICE POWDER: 427.9 grams of 64 Brix concentrated orange juice were admixed with 2285.4 grams of *powdered* anhydrous dextrose in a mixer or agitating device for approximately 30 minutes at a low agitating speed. At the completion of this step, the mixture was removed from the agitating device and placed on trays where the rate of hydration of the moisture into the anhydrous dextrose molecules was expedited by heating the mixture at a low temperature of about 40° centigrade for 2–3 hours. Once the desired degree of dryness was achieved, the mixture was powdered in a blender and a normal amount of certified flavoring and coloring substances were added prior to packaging. The dried powder produced had a moisture content of about 5% (virtually all of which was present as internal or bound moisture in the dextrose molecules) and was a non-hygroscopic, free-flowing powder. When the resulting juice powder was reconstituted in the appropriate amount of water, it was subjected to a taste test. The taste test panel found the resulting beverage to closely resemble a fresh orange juice beverage and indicated a preference for this beverage over conventionally dried orange juice beverages.

EXAMPLE II

ORANGE JUICE POWDER: 20 grams of 64 Brix concentrated orange juice were admixed with 121.6 grams of *pulverized* anhydrous dextrose in an agitating device for approximately 15 minutes at a low agitating speed until the desired degree of dryness was achieved. The dried product was removed from the agitating device, powdered in a blender and a normal amount of certified flavoring and coloring substances were added prior to packaging. When the resulting juice powder was reconstituted in the appropriate amount of water, a taste test panel indicated a preference for this beverage over conventionally dried orange juice beverages.

EXAMPLE III

ORANGE JUICE POWDER: 50 grams of 64 Brix concentrated orange juice were admixed with 296 grams of *granular* anhydrous dextrose in an agitating device for 30 minutes at a low agitating speed. The mixture was then removed and placed on trays where it was subjected to a hydration enhancing step at a low temperature of about 40° centigrade for approximately 3–4 hours. The resulting free-flowing juice powder produced the same favorable results as in Examples 1–2 and the taste test panel indicated a preference for this reconstituted orange juice beverage over conventionally dried orange juice beverages.

EXAMPLE IV

GRAPE JUICE POWDER: 50 grams of 46 Brix concentrated grape juice were admixed with 400 grams of powdered anhydrous dextrose in a mixer or agitating device for approximately 20 minutes at a low agitating speed. Then the mixture was removed from the agitating device and placed on trays where the rate of hydration of the mixture was expedited by heating the same at a low temperature of about 45° centigrade for 1–2 hours. The resulting mixture was powdered in a blender and a normal amount of certified flavoring and coloring substances were added prior to packaging. When the free-flowing powder was reconstituted in an appropriate amount of water, a taste test panel indicated a significant preference for this beverage over conventionally dried grape juice beverages.

EXAMPLE V

TEA POWDER: 100 grams of 44 weight percent concentrated tea were admixed with 924 grams of powdered anhydrous dextrose in an agitating device for approximately 15–20 minutes until the desired degree of dryness was achieved. The dried product was removed from the agitating device, powdered in a blender and a normal amount of certified flavoring and coloring substances were added prior to packaging. When the free-flowing tea powder was reconstituted in an appropriate amount of water, the resulting tea beverage was subjected to a taste test panel who indicated a significant preference for this beverage over conventionally dried tea beverages.

EXAMPLE VI

COFFEE POWDER: 50 grams of 17.6 weight percent soluble solids coffee extract were admixed with 330 grams of powdered anhydrous dextrose in an agitating device for approximately 15–20 minutes until the desired degree of dryness was achieved. The dried product was removed from the agitating device, powdered in a blender and a normal amount of certified flavoring ingredients were added prior to packaging. When the coffee powder was reconstituted in an appropriate amount of water, the resulting coffee beverage was subjected to a taste test panel who indicated a significant preference for this beverage over conventionally dried coffee beverage.

EXAMPLE VII

COFFEE POWDER: 40 grams of 17.6 weight percent soluble solids coffee extract were admixed with 500 grams of powdered anhydrous dextrose in an agitating device for approximately 5–10 minutes until the desired degree of dryness was achieved. The dried product was removed from the agitating device, powdered in a blender and a normal amount of certified flavoring ingredients were added prior to packaging. When the free-flowing coffee powder was reconstituted in an appropriate amount of water, the resulting coffee beverage was tested by a taste test panel who indicated a preference for this beverage over conventionally dried coffee beverages.

It is apparent from the foregoing examples that a novel method is provided for preparing fruit, vegetable and/or botanical juices in dry, free-flowing, granular form, and that novel dry products are provided. These dry powders have important advantages over conventionally dried powders, such as resistance to moisture, resistance to dust formation, flavor retention, lack of flavor degradation, quick solution or dispersion in water to yield a product more closely resembling fresh juice beverages in quality, flavor and appearance.

It should be manifest that while preferred embodiments of the present inventions have been shown in examples 1–7, the present invention is nevertheless capable of wide variation within the purview of the invention. For example, under circumstances where it is desirable to expedite the rate of hydration drying (see Examples 1, 3 and 4), this hydration enhancing step could be conducted simultaneously with the agitating of the mixture by utilizing a conventional jacketed mixing vessel.

It is believed that the present invention, its modus operandi, and many of the advantages attendant thereto should be readily understood from the foregoing without further description, and it also should be manifest that, while preferred embodiments and examples of the present invention have been shown and described for illustrative purposes, it is nevertheless capable of wide variation within the purview of the invention as defined in the appended claims.

The embodiments of the invention in which an exclusive property right or privilege is claimed are defined as follows:

1. A hydration drying process for preparing a dried, free-flowing juice powder without the necessity of a high temperature heating operation from a juice concentrate selected from the group consisting of orange juice, grape juice and tea, which comprises admixing a juice concentrate with at least 11 grams of ahydrous dextrose for each gram of moisture present in said juice concentrate in an agitating device until the anhydrous dextrose is substantially hydrated and a free-flowing non-hygroscopic juice powder having a rapid rate of dispersibility and dissolution upon reconstitution in water is produced, said anhydrous dextrose being admixed in a powdered or pulverized state to reduce the drying time required to produce a dried, free-flowing product, and wherein the rate of hydration of the dextrose molecules is expedited by heating the mixture at low temperatures of about 35° centigrade to 85° centigrade, and further wherein said juice powder has a total moisture content of about 5%, most of which is bound moisture in the hydrated dextrose molecules, and further wherein only a negligible amount of free moisture is available in the powder for wetting or subsequent chemical reaction with other particles during the drying process.

2. A hydration drying process for preparing a dried, free-flowing coffee powder without the necessity of a high temperature heating operation from a coffee extract which comprises admixing a coffee extract with at least 8 grams of anhydrous dextrose for each gram of moisture present in the coffee extract in an agitating device until the anhydrous dextrose is substantially hydrated and a free-flowing, non-hygroscopic coffee powder is produced, said anhydrous dextrose being admixed in a powdered or pulverized state to reduce the hydration drying time required to produce a dried, free-flowing coffee powder, and wherein the rate of hydration of the dextrose molecules is expedited by heating the mixture at low temperatures of about 35° centigrade to 85° centigrade, and further wherein said coffee powder has a total moisture content of about 8%, most of which is bound moisture in the hydrated dextrose molecules, and further wherein only a negligible amount of free moisture is available in the powder for wetting or subsequent chemical reaction with other particles during the drying process.

3. A hydration drying process for preparing a dried, free-flowing tea powder without the necessity of a high temperature heating operation from a tea extract which comprises admixing a tea extract with at least 11 grams of anhydrous dextrose for each gram of moisture present in said tea extract in an agitating device until the anhydrous dextrose is substantially hydrated and a free-flowing, non-hygroscopic tea powder having a rapid rate of dispersibility and dissolution upon reconstitution in water is produced, said anhydrous dextrose being admixed in a powdered or pulverized state to reduce the hydration drying time required to produce a dried, free-flowing tea powder, and further wherein said free-flowing tea powder is provided with a total moisture content of about 5%, most of which is bound moisture in the hydrated dextrose molecules, and further wherein only a negligible amount of free moisture is available in the powder for wetting or subsequent chemical reaction with other particles during the drying process.

* * * * *